UNITED STATES PATENT OFFICE.

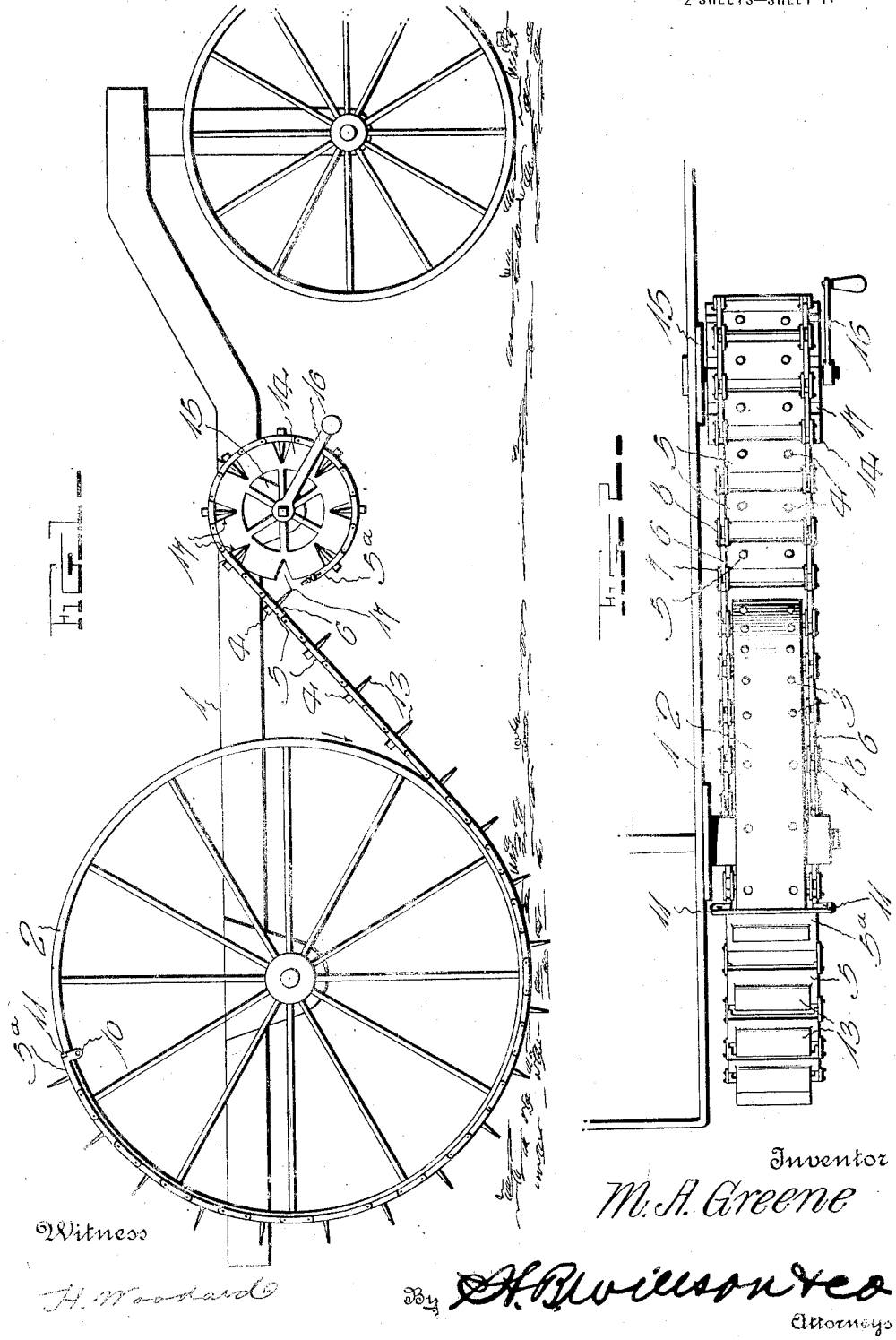

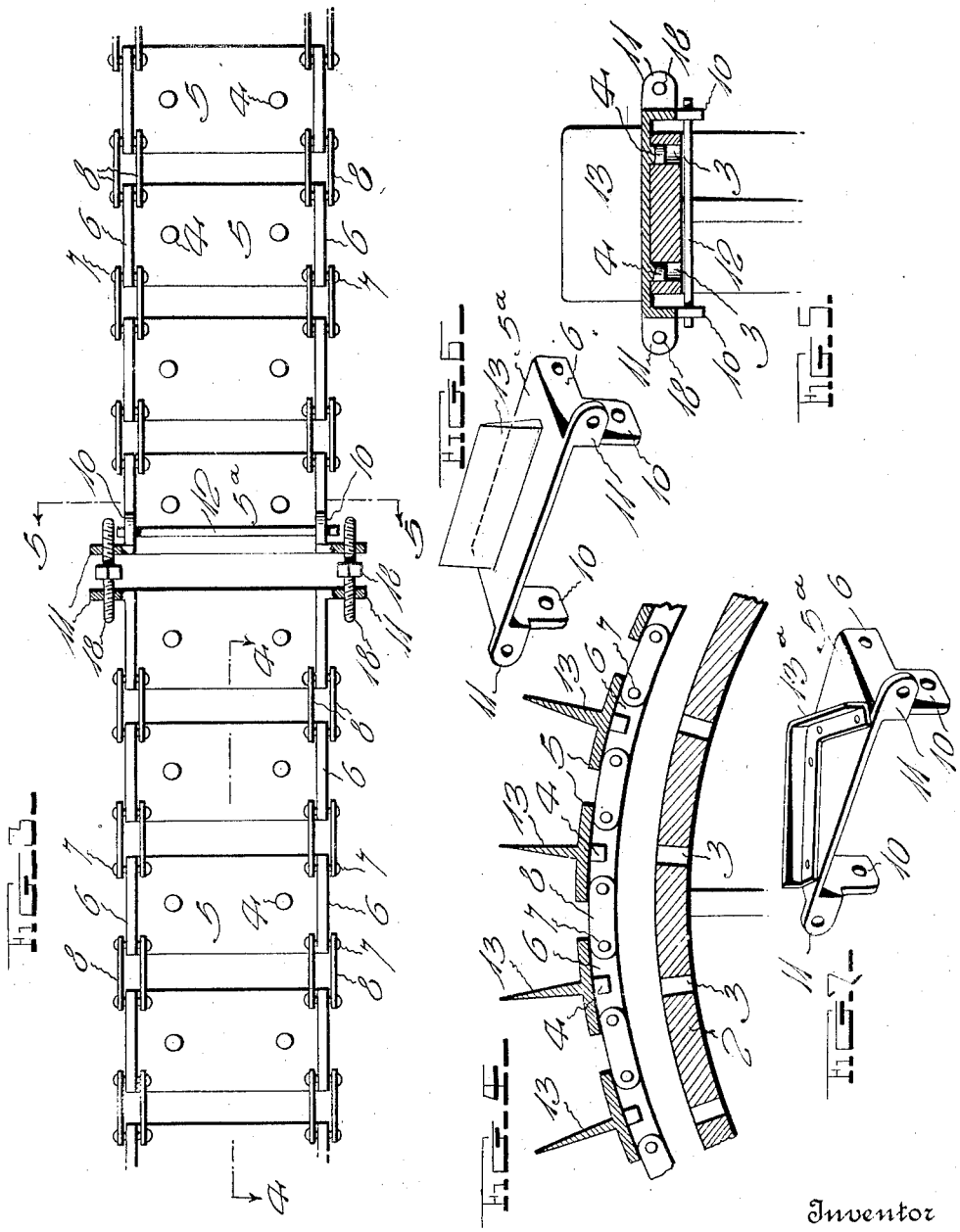

MORGAN A. GREENE, OF RUPERT, IDAHO.

DETACHABLE MUD-SHOE FOR TRACTORS.

1,382,078.     Specification of Letters Patent.    Patented June 21, 1921.

Application filed March 16, 1920. Serial No. 366,214.

*To all whom it may concern:*

Be it known that I, MORGAN A. GREENE, a citizen of the United States, residing at Rupert, in the county of Minidoka and State of Idaho, have invented certain new and useful Improvements in Detachable Mud-Shoes for Tractors; and I do declare the following to be a full, clear, and exact description of the invention, such as will enable others skilled in the art to which it appertains to make and use the same.

This invention relates to tire-chains, and more particularly to an improved tire-chain or mud-shoe.

The principal object is to provide an improved form of tractor plate and a tire-chain comprising a plurality of such tractor plates.

Other objects and advantages will be pointed out or implied in the following details of description in connection with the accompanying drawings in which:

Figure 1 is a side elevation of a main frame and wheels of a tractor, my improved tractor-chain being associated therewith.

Fig. 2 is a top plan view illustrating a portion of the structure shown in Fig. 1.

Fig. 3 is an enlarged detail view illustrating the adjustably connected ends of the chain and a number of the traction plates associated therewith, the traction plates presenting their inner surfaces to view.

Fig. 4 is a detail sectional view, the section through the chain being taken substantially along the line 4—4 of Fig. 3, a fragment of the rim being shown slightly removed from the position in which it is adapted to engage with the chain.

Fig. 5 is a detail sectional view, the section through the chain being taken substantially along the line 5—5 of Fig. 3, a fragment of the traction wheel being engaged with the chain.

Fig. 6 is a perspective view of one of the end links or traction plates of the chain.

Fig. 7 is a view similar to Fig. 6 but showing a different form of traction calk.

Referring to these drawings in detail, in which similar reference characters correspond with similar parts throughout the several views, and in which the tractor chassis or main frame 1 may be of any ordinary construction, the invention consists in the details of construction specifically described as follows:

The traction wheels 2 (only one of which is illustrated in the drawing) are preferably provided with a series of equally spaced holes or cavities 3 which preferably, extend entirely through the tire or rim of the wheel so that mud, stones, etc., will not be likely to fill these cavities by lodging therein, and may be removed with comparative ease in case it does lodge therein. The object of these cavities is to receive a series of studs or projections 4 which extend inward from the inner surfaces of the traction plates which are generally indicated by the reference characters 5 and 5ᵃ. Each of these traction plates is formed with a pair of flanges 6, these flanges extending inward from two opposite edges of the respective plates 5 and 5ᵃ, and being apertured to receive pivots or rivets 7 by means of which the flanges 6 are pivotally connected together through the medium of pairs of links 8. One link 8 of each pair is seated against the inner surfaces of two adjacent flanges 6, and the outer link 8 of each pair is seated against the outer surfaces of two flanges 6. By this construction, the maximum strength is obtained, consistent with the use of comparatively small rivets 7 and correspondingly small holes in the flanges 6 and links 8. The flanges 6 are spaced sufficiently far apart to permit the cylindrical tread portion of the tire 2 to be received therebetween and between the inner ends of the rivets 7, and this construction coacts with the studs 4 in preventing lateral movement of the tread plates on the tire-tread. Moreover, in case one or more of the studs 4 should be broken off or become inefficient because of wear (after long usage) the flanges will prevent lateral displacement of the chain with relation to the tire. The main purpose of the studs 4, however, is to prevent the revolving movement of the chain on the tire.

One or both of the end plates or links of the chain are provided with apertured ears or flanges these flanges being preferably L-shaped or each comprising two apertured wings 10 and 11 which extend at right angles to one another. The wings 10 are apertured to receive a rod or bolt 12 which engages with the inner periphery of the cylindrical metal tire 2 for coacting with the studs 4 of this plate to hold this end of the chain in a fixed position on the tire while the remaining portion of the chain is being wound upon the outer surface of the tire as illustrated in Fig. 1. Each traction plate is provided with a traction-spur, plate or calk 13 or 13ª which extends radially out from the surface of the plate, and preferably tapers toward its outer end so that it enters the mud, soft dirt or snow with comparative ease. The purpose of these blades 13 is self-evident to persons who are familiar with devices of this character.

A reel or windlass 14 not claimed herein is journaled in bearings 15, on the frame 1, one of such bearings being illustrated at 15 in Fig. 1. It should be understood, however, that the reel 14 may be journaled at any other suitable portion of the frame. A handle or crank is provided for rotating the windlass 14, and the latter is provided with V-shaped substantially radial notches 17 which receive the respective blades 13 and assist in holding the chain in engagement with the reel 14 when the latter is rotated for winding the chain on the wheel. The operation of winding the chain on the wheel 2 consists in rotating the latter in the direction of the arrow while one of its links or traction plates 5ª is secured to the tire or rim of the wheel 2 in the manner indicated in Figs. 1 and 5. When the chain has been fully unwound from the reel 14 and fully wound upon the wheel 2, the two end links 5ª are secured together by means of securing and adjusting members 18 which extend through apertures of the wings 11. As illustrated in Fig. 3, the members 18 are formed with right-hand threads at one end and with left-hand threads at the other, and these threaded ends are engaged with internal threads of the wings 11 and are operable as turn-buckles to secure the chain on the wheel. However, the engagement of the studs 4 with the holes 3 prevents the end plates 5ª from moving bodily toward one another.

Although this form of the invention is here described very specifically, it is not intended to limit this invention to these exact details of construction and arrangement, but changes may be made within the scope of the inventive ideas as claimed.

What I claim as my invention is:

1. A tire-chain comprising traction plates, means pivotally connecting the traction plates to one another, the traction plates at the ends of said chain being formed with screw-threaded ears, screws in said ears to connect the ends of the chain to one another, and a rod insertable through the ears of one of said end traction plates and engageable with the inner periphery of a wheel to secure this end of the chain to the wheel.

2. A tire-chain comprising traction plates, each formed with inwardly projecting flanges at two opposite edges and with an outwardly projecting traction blade on its opposite side from said flanges, links pivotally connecting the flanges of each traction plate to those of an adjacent traction plate, and tire-engaging studs extending inward from the inner surfaces of the traction plates and adapted to fit into cavities in a tire when the chain is in operative position on the tire, said flanges being adapted to receive the tire therebetween when the chain is being attached to the tire.

3. In a tire-chain attachable to a cylindrical metal tire having cavities therein, a plurality of traction plates provided with studs to fit in said cavities, said traction plates being formed with inwardly projecting flanges on opposite edges to receive the tire therebetween and to provide pivotal connections, means coacting with said pivotal connections to unite the traction plates, outwardly projecting traction spurs on said traction plates, apertured lugs on the traction plates at the ends of the chain, means to extend through the lugs at one end of the chain and engage the said tire for holding said chain end on the tire, and means coacting with said lugs to secure the two chain ends to one another.

In testimony whereof I have hereunto set my hand.

MORGAN A. GREENE.